United States Patent Office 3,224,949
Patented Dec. 21, 1965

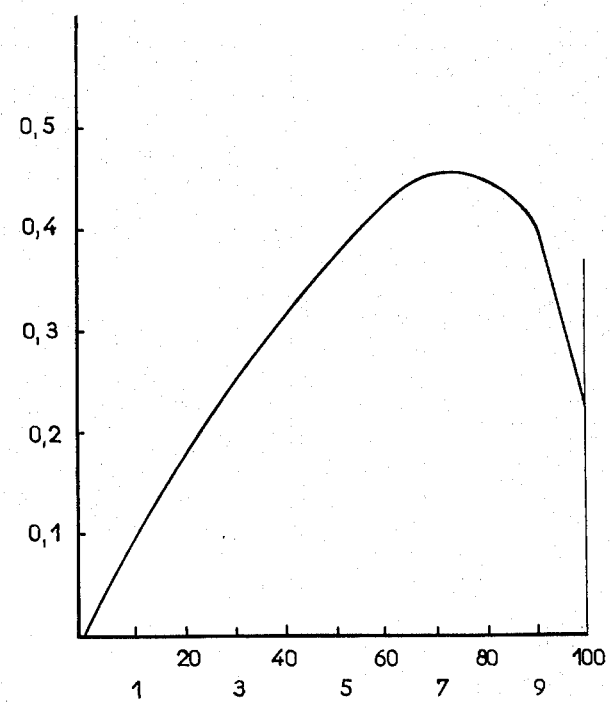

3,224,949
POLYMERIZATION OF DI-OLEFINS
Jacques Grosmangin and Gérard Fernand Aubin, Le Havre, France, assignors to Compagnie Francaise de Raffinage, Paris, France
Filed July 19, 1960, Ser. No. 43,840
Claims priority, application France, Aug. 3, 1959, 801,907, Patent 1,241,211
7 Claims. (Cl. 204—154)

The present invention resides in a process of polymerization of di-olefins having conjugate linkages, such as butadiene, isoprene, piperylene, to solid products having a high molecular weight, by subjecting them to the action of ionizing radiations such as beta-rays or gamma-rays, or to bombardment by accelerated electrons.

The present applicant has found that if the monomer is subjected to the action of a radiation having an intensity I expressed, for example, in rads per minute (1 rad represents an energy of 100 ergs received per gram of substance irradiated), at the ordinary temperature, the speed of polymerization is proportional to $I^{0.75}$ in the case of butadiene and $I^{0.65}$ in the case of isoprene. If, on the contrary, the process is carried out at low temperature (−78° C., for example), the speed of polymerization is then proportional to I. This observation emphasizes the importance of operating at low temperature, thereby permitting of a better use of a given intensity of radiation, which consequently makes it possible to obtain a better energy efficiency.

The following examples illustrate this feature of the present invention.

EXAMPLE 1

A sample of isoprene was irradiated in an inert atmosphere under a Van de Graaff accelerator of 1.5 mev. and 50μ a., for a period of 100 seconds of effective exposure. The dose received is under these conditions $9.4 \times 10^6$ rad. It is observed that the quantity of polymer formed increases as the temperature falls as long as the isoprene remains in the liquid state, as set forth in Table 1 below:

Table 1

| Temperature | Dose | Percentage by weight of polymerized isoprene |
|---|---|---|
| +12° C | $9.4 \times 10^6$ | 1.53 |
| −78° C | $9.4 \times 10^6$ | 1.90 |
| −119° C | $9.4 \times 10^6$ | 3.02 |

EXAMPLE 2

Two samples of butadiene are irradiated by the radiations from a source of cobalt 60 under varying intensities and the quantity of polymers thus formed in 100 hours at the respective temperatures of +17° C. and −78° C. is then determined.

The results are given in Table 2 below:

Table 2

| Temperature (° C.) | Intensity (in rads per min.) | Percent polybutadiene formed in 100 hours |
|---|---|---|
| +17 | 2,000 | 3.6 |
| −78 | 2,000 | 4.0 |
| +17 | 10,000 | 13.0 |
| −78 | 10,000 | 17.0 |
| +17 | 20,000 | 20.0 |
| −78 | 20,000 | 31.5 |

The molecular mass, which is measured by the method of diffusion of the light of the polybutadienes formed at −78° C. is of the order of 130,000 and is greater than that of the polymers obtained at +17° C.

The present applicant has also established that the energy efficiency of the reaction is considerably increased if, instead of operating on pure di-olefins, the di-olefins considered are subjected to irradiation in solution in a chlorinated solvent having a polar character.

The following examples, which are given without limitation, illustrate this second characteristic feature of the present invention.

EXAMPLE 3

Different solutions of butadiene 1–3 of very high purity in methylene chloride at a temperature of −78° C., are subjected to the action of gamma-rays from a source of cobalt 60. The quantity of polymers formed for an energy of $10^7$ rad absorbed by the solution was thus assessed in the case of different intensities of radiation, expressed in rads per minute. These results are summarized in Table 3.

Table 3

| Composition of the solution | | Conc. butadiene, mols/l. | Intensity, rads/min. | Polymers formed per $10^7$ rads. | |
|---|---|---|---|---|---|
| Vol. butadiene | Vol. methylene chloride | | | Mols | Grams |
| 1,000 | 0 | 11.50 | 4,400 | 0.343 | 18.52 |
| 923.48 | 76.52 | 10.62 | 372 | 0.642 | 34.67 |
| 915.6 | 84.4 | 10.53 | 4,400 | 0.631 | 34.07 |
| 579.13 | 420.87 | 6.66 | 875 | 0.870 | 46.98 |
| 495.65 | 504.35 | 5.70 | 396 | 0.780 | 42.12 |
| 476.5 | 523.5 | 5.48 | 4,400 | 0.824 | 44.50 |
| 75.13 | 924.87 | 0.864 | 875 | 0.477 | 25.76 |
| 67.4 | 932.6 | 0.775 | 4,400 | 0.408 | 22.03 |
| 58.96 | 941.04 | 0.678 | 396 | 0.403 | 21.76 |

It can be seen that the speed of reaction is at maximum in the case of concentrations of the order of 4 to 7 mols of butadiene per litre of solution (namely 200 to 400 grams of butadiene per litre), and this holds true irrespective of the intensity of radiation.

The molecular weight (method of diffusion of light) of the polymers obtained under these conditions is of the order of 130,000.

EXAMPLE 4

Solutions of isoprene in dichloro-ethane at −78° C. have been irradiated in the Van de Graaff accelerator.

Table 4 gives the quantities of polymers formed in the case of a dose received of $10^7$ rad.

Table 4

| Composition of the solution | | Conc. isoprene, mols/l. | Isoprene polymerized for $10^7$ rad received | |
|---|---|---|---|---|
| Vol. isoprene | Vol. dichloro-ethane | | Mols | Grams |
| 1,000 | 0 | 10 | 0.20 | 13.6 |
| 912 | 88 | 9.12 | 0.40 | 27.2 |
| 666 | 334 | 6.66 | 0.433 | 29.4 |
| 500 | 500 | 5 | 0.33 | 22.4 |
| 333 | 667 | 3.33 | 0.273 | 18.5 |
| 90 | 910 | 0.9 | 0.109 | 7.4 |

These results show a maximum energy efficiency for a concentration of 6 to 9 mols per litre of isoprene. They are reproduced on the attached graph in which the percentage of the volume of isoprene together with the number of mols per litre of isoprene in the solution have been plotted as abscissae, while the number of molecules of isoprene polymerized for $10^7$ rads received have been plotted as ordinates.

EXAMPLE 5

A solution of isoprene in methylene chloride at a concentration of 5 mols per litre of isoprene, with an intensity of 4,400 rads per minute, was irradiated with a source of cobalt 60 at −78° C. The polymerization of 0.56 mol of isoprene was found to take place for $10^7$ rad received by the solution.

What we claim is:

1. In a method of increasing the reaction rate and radiation utilization in the polymerization of conjugated di-olefins into solid polymer products under the action of ionizing radiation where the speed of polymerization varies for different intensities of said radiation, the steps which comprise subjecting said di-olefins to said ionizing radiation for effecting said polymerization reaction, increasing the intensity of said radiation until the resulting increase in speed of formation of said polymer products in less than directly proportional to about the first power of said increased radiation intensity, and lowering the temperature of said reaction until the speed of formation of said polymer products is directly proportional to about the first power of said increased radiation.

2. A method as recited in claim 1 in which said ionizing radiation comprises beta rays.

3. A method as recited in claim 1 in which said ionizing radiation comprises gamma rays.

4. A method as recited in claim 1 in which said ionizing radiation comprises bombardment by accelerated electrons.

5. A method as claimed in claim 1 in which the temperature is less than −40° C. approximately.

6. A method as claimed in claim 1 in which the di-olefins subjected to irradiation are in solution in a chlorinated solvent having a polar character.

7. A method as claimed in claim 5 in which the di-olefins subjected to the irradiation process are in solution in a chlorinated solvent of a polar character.

References Cited by the Examiner

UNITED STATES PATENTS 2,945,792  7/1960  Miller _____ 204—154
3,012,950  12/1961  Anderson _____ 204—162

FOREIGN PATENTS 665,262  1/1952  Great Britain.

MURRAY TILLMAN, *Primary Examiner.*

J. R. SPECK, *Examiner.*